SYNCHRONISING ARRANGEMENTS IN ELECTRIC TELEGRAPH SYSTEMS

Filed Nov. 2, 1954 5 Sheets-Sheet 1

Inventors
H. T. PRIOR
W. F. S. CHITTLEBURGH
By Robert Harding Jr.
Attorney

Aug. 6, 1957 H. T. PRIOR ET AL 2,802,051

SYNCHRONISING ARRANGEMENTS IN ELECTRIC TELEGRAPH SYSTEMS

Filed Nov. 2, 1954 5 Sheets-Sheet 2

Inventors
H. T. PRIOR
W. F. S. CHITTLEBURGH
By [signature]
Attorney

*Inventors*
H. T. PRIOR
W. F. S. CHITTLEBURGH
*By* Robert Harding Jr.
*Attorney*

SYNCHRONISING ARRANGEMENTS IN ELECTRIC TELEGRAPH SYSTEMS

Filed Nov. 2, 1954 5 Sheets-Sheet 4

Inventors
H. T. PRIOR -
W. F. S. CHITTLEBURGH
By Robert Harding Jr.
Attorney

Inventors
H. T. PRIOR
W. F. S. CHITTLEBURGH
By Robert Harding Jr.
Attorney

United States Patent Office 2,802,051

Patented Aug. 6, 1957

2,802,051

SYNCHRONISING ARRANGEMENTS IN ELECTRIC TELEGRAPH SYSTEMS

Hector Thomas Prior and William Francis Sidney Chittleburgh, London, England, assignors to International Standard Electric Corporation, New York, N. Y.

Application November 2, 1954, Serial No. 466,411

Claims priority, application Great Britain November 3, 1953

10 Claims. (Cl. 178—69.5)

The present invention relates to synchronising arrangements for electric telegraph systems of the kind which transmit code signals defined by transitions (from mark to space condition or vice-versa), which are intended to occur at certain instants regularly spaced in time. Such systems include Baudot multiplex systems, for example, and also a special type of start-stop system in which the code groups are recorded on tape before transmission in such manner that all transmitted transitions occur at certain of the regularly spaced instants.

In all such systems the receiving apparatus must be synchronised with the transmitting apparatus in such manner as to produce accurate correspondence between the signal element periods at both ends of the system. This has sometimes been done previously by transmitting synchronising signals, which occupy signalling time which could otherwise be used for an additional traffic channel.

However, various arrangements have also been proposed for synchronous communication systems (that is systems in which there are regularly repeated instants at which signals may be transmitted) in which no separate synchronising signal is used, in order to avoid reducing the information-carrying capacity of the system. The principal object of the present invention is to improve the synchronising arrangements of telegraph systems of this last-mentioned type, and in particular, to guard against failure due to loss of synchronisation which may occur during short breaks in transmission due, for example, to selective fading in radio circuits.

A secondary object is to avoid the loss of synchronisation which is liable to occur during periods when no message signals are being transmitted.

The principal object is achieved according to the invention by providing a receiving circuit for a synchronous telegraph system comprising means controlled by an oscillator for regenerating the received signals, means for deriving from the received signals and from the regenerated signals a train of unidirectional control pulses whose duration and polarity are determined by the time difference between corresponding transitions of the received signals and the regenerated signals, means for integrating the unidirectional control pulses, and means for applying the integrated pulses to adjust the oscillator frequency in such a manner as substantially to maintain a specified time difference between the said received signals and the regenerated signals.

To achieve the secondary object, the invention also provides a synchronous telegraph system employing such a receiving circuit and including means for combining with the message signals at the transmitter a predetermined continuous auxiliary signal, and for removing it again in the receiving circuit.

In this specification, the interval between successive regularly spaced instants at which transitions may occur will be called the "unit period." For example, in a telegraph system operating at 50 bauds, the unit period will have a duration of 20 milliseconds. The marking or spacing condition set up by a telegraph transmitter, or other like device or circuit, will be referred to generally as the "signal condition" when either condition may apply, and transitions from mark to space and from space to mark will be referred to as transitions in opposite senses.

The invention will be described with reference to the accompanying drawings in which.

Figure 1:
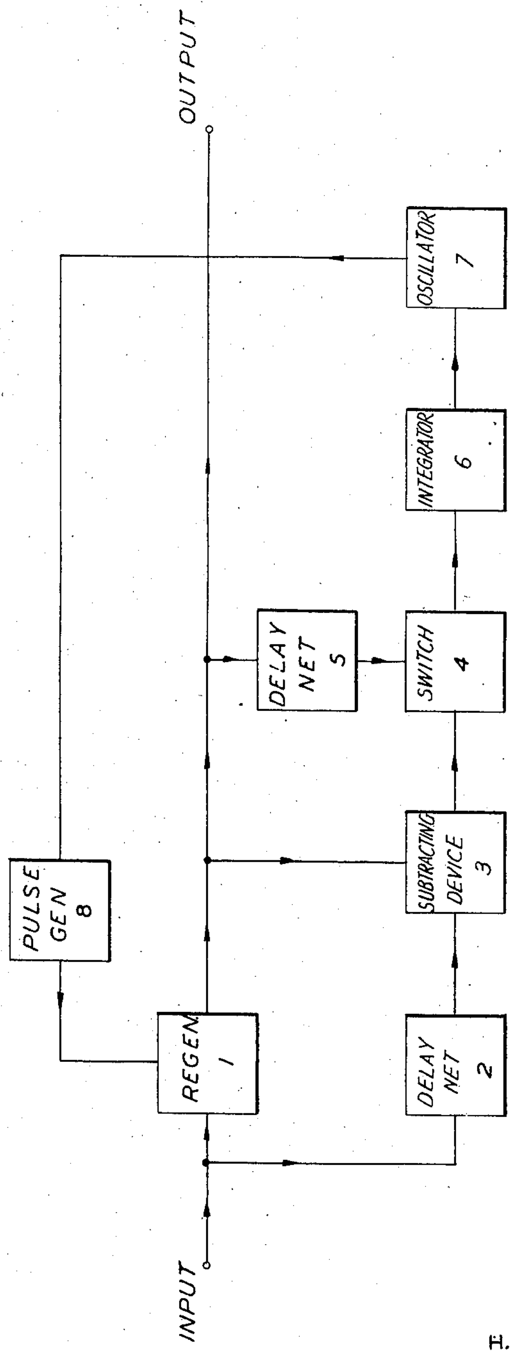
Fig. 1 shows a block schematic circuit diagram of an embodiment of the invention.

Referring now to Fig. 1, there is shown one form of synchronising circuit according to the invention for a synchronous telegraph receiver in a system which does not employ separate synchronising signals. The incoming signals are applied over a terminal marked Input to a signal regenerator 1 of conventional type and also to a delay network 2 which introduces a delay of half a unit period (that is, a delay of 10 milliseconds in the case of a system working at a speed of 50 bauds). The outputs of the regenerator 1 and of the delay network 2 are applied to a subtracting device 3 which subtracts the waveform of the delayed incoming signals from that of the undelayed regenerated signals, whereby there are produced short substantially rectangular pulses of one sign corresponding to mark-to-space transitions, and similar rectangular pulses of the other sign corresponding to space-to-mark transitions. The duration of these pulses is determined by the time delay introduced by the regenerator 1, as will be explained more fully later.

The pulses from the device 3 are applied over a switch circuit 4 to an integrator 6. Switch 4 is controlled by the regenerated pulses from the regenerator 1 after a delay of half a unit period in the delay network 5. The switch 4 is operated by the signals from the delay network 5 in such manner as to invert only every alternate pulse, so that all the control pulses which emerge from the switch 4 will have the same polarity. As will be explained later, the control pulses will be of one polarity when the regenerated signals are late, and of the other when they are early, the duration of the control pulses being determined by the time error.

The control pulses are integrated by an integrator 6 in order to produce a direct control voltage or current which is applied to adjust in known manner the frequency of an oscillator 7 which controls the generation of the sampling pulses by the pulse generator 8. These sampling pulses are short pulses which are applied to the regenerator 1 in known manner to produce the regenerated signals, and when the receiving circuit is properly synchronised, appear at the centre of each unit period of the received signals.

If the sampling pulses are late, or early, a corresponding control voltage appears at the output of the integrator 6, which adjusts the frequency of the oscillator 7 in such manner as to correct the timing of the sampling pulses.

The regenerated signals are supplied from the regenerator 1 to any suitable type of telegraph receiving device over the terminal marked Output.

The operation of the circuit of Fig. 1 will be explained in more detail with reference to Fig. 2.

Figure 2:
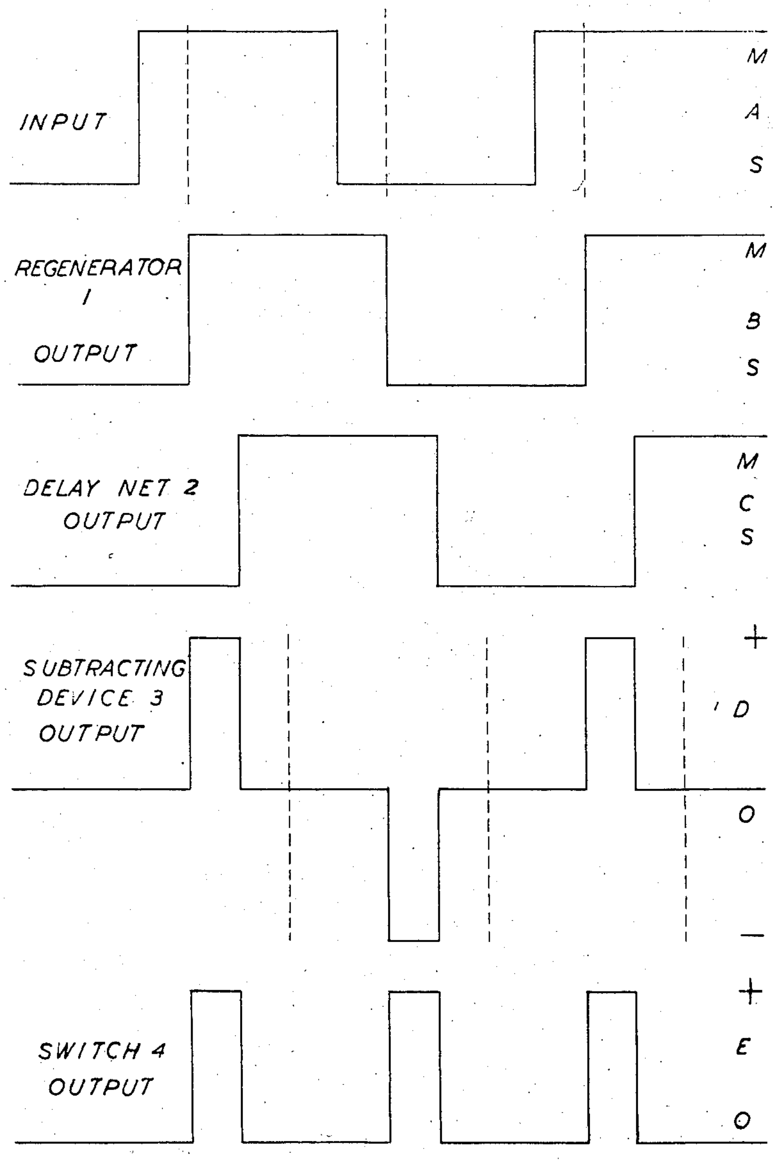
Fig. 2 shows graphical diagrams used in explaining the operation of Fig. 1.

Curve A, Fig. 2 shows the waveform of a signal received by regenerator 1 (Fig. 1), consisting of space, one unit period mark, one unit period space and then a mark. This signal is examined in the regenerator 1 by the sampling pulses produced by pulse generator 8. The correct timing of these sampling pulses is at the centres of the unit periods of the incoming signal, as already stated, since in the case of a distorted signal this would give the maximum margin. Let it be supposed however that the sampling pulses occur at too early by a quarter of the unit period, as shown by the dotted lines in curve A, Fig. 2.

The effect of this will be that the output from the regenerator 1 will be as shown in curve B, Fig. 2; that is to say, a quarter of a unit period earlier than it would have been if the pulses had been correctly timed.

The delay network 2 has a delay of half a unit period, so that its output, shown in curve C, Fig. 2, has transitions occurring at the times at which they would have occurred in the output of regenerator 1 with correctly timed sampling pulses.

By subtracting the output of the delay network 2 from the output of regenerator 1, the signal shown in curve D, Fig. 2, is obtained. This consists of marking pulses a quarter of a unit period long produced by space to mark transitions, and spacing pulses a quarter of a unit period long produced by mark to space transitions.

The pulses from the subtracting device 3 are passed through the switch 4 the operation of which is controlled by the output of the regenerator 1 delayed by half a unit period in the delay network 5. The switch 4 is such that it is only placed in condition to reverse a pulse from the subtracting circuit 3 if a mark condition is applied from the delay network 5 to the switch 4. The changeover times of switch 4 are as shown by the dotted lines in curve D, Fig. 2, and so only the second pulse is inverted, and not the first or third. The control pulses from switch 4 will thus appear as shown by curve E, Fig. 2.

By integrating the series of control pulses of curve E, Fig. 2, in the integrator 6, a direct current or voltage is derived which, since the pulse amplitude is constant, is proportional to the pulse duration. The pulse duration being proportional to the timing error of the sampling pulses applied to the regenerator 1, a direct control current or voltage is available to adjust the frequency of the local oscillator 7 which controls the source of the sampling pulses.

This is achieved by designing the oscillator 7 in known manner so that its frequency can be slightly changed by applying to it the control voltage or current from the integrator 6. The frequency is changed in such direction, according to the sign of the control voltage or current, that the timing error of the sampling pulses is reduced, whereby accurate synchronism with corresponding oscillator at the transmitting end of the system (not shown) will be maintained.

In order that the desired synchronism be maintained during short interruptions of the signals, the integrator 6 is given a suitably large time constant (for example 1 minute). This sets a limit to the maximum allowable frequency difference between the control oscillators at the transmitting and receiving ends of the system, for it is necessary that the drift should not exceed one unit period during the longest likely period of an interruption in the signals. This condition is in practice easily met by the use of crystal-controlled oscillators.

Fig. 2 illustrates the particular case of three transitions spaced apart by one unit period. In the case of a series of normal telegraph signals, transitions may be spaced by various numbers of unit periods, but over a relatively long period, of the order of the time constant of integrator 6, the number of control pulses such as those shown in curve E, Fig. 2, which occur per second will be substantially constant on the average, so that the control direct voltage or current will depend substantially only on the duration of the control pulses. However, it may be desirable to arrange for the relation between the control current or voltage and the oscillator frequency to be non-linear in such manner that the control ratio decreases for large control currents or voltages, so that a reasonable control ratio will be obtained for both low and high rates of occurrence of transitions. This can be achieved for example, by passing the control current or voltage through a limiting amplifier, or by providing an equivalent limiting action in the frequency control.

Fig. 2 also illustrates a particular case in that the received signals are supposed to be undistorted (that is, the transitions have no time errors) and that the phase of the oscillator 7 is advanced with respect to the oscillator at the transmitting end of the system.

If the signals are time-distorted, the duration of the control pulses shown in curve D, Fig. 2, will not be uniform, but their average duration will be proportional to the timing error of the sampling pulses, and thus to the phase error of the oscillator 7. The result of integration with a relatively large time constant will be to smooth out the variations in duration of the control pulses so that the control voltage or current produced by the integrator 6 will still be substantially proportional to the phase error of the oscillator 7.

If the oscillator 7 is retarded in phase with respect to the transmitting oscillator, the sampling pulses will be too late instead of too early, and it will be clear that the pulses of curve B, Fig. 2 will be later than those of curve C, so that all the pulses of curve D will be inverted. It follows that the control pulses of curve E will be negative instead of positive and the control voltage or current applied to the oscillator 7 from the integrator 6 will be reversed in sign. The oscillator frequency will thus be slightly increased in order to correct the timing of the sampling pulses.

It will be evident that synchronism will be lost when the transmission of messages ceases, and will take a relatively long period (say one minute) to become re-established when transmission begins again, depending on the time constant of the integrator 6. To overcome this objection, it may be arranged to transmit a continuous interval signal of some simple type (for example, reversals) for maintaining synchronism. It can be arranged so that the interval signal is switched on and off automatically in response to the stopping and re-starting of the normal transmission, or a continuous signal of predetermined type may be superposed on the normal transmitted signals, as will be explained later.

Figure 3:
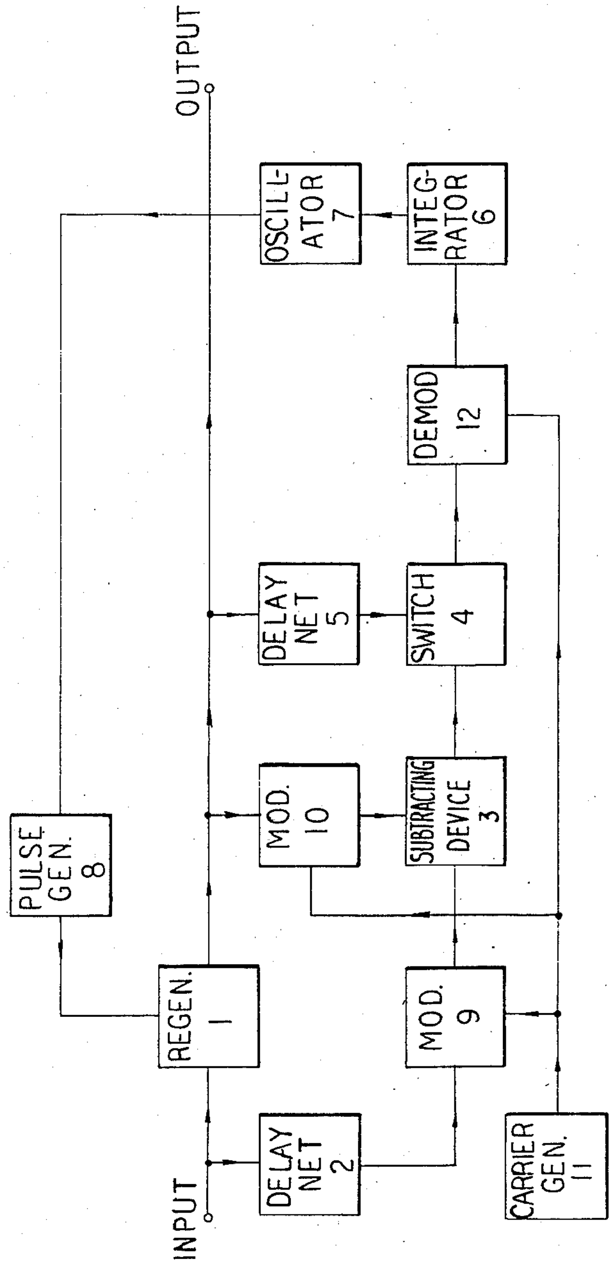
Fig. 3 shows a modification of Fig. 1.

Fig. 1 does not show any amplifiers, which may evidently be included where required. As, however, some of these amplifiers will need to be direct current amplifiers, which are well known to be troublesome to stabilise, it is preferable to modify the circuit to avoid the use of any direct current amplifiers at points where stability is important. The preferred arrangement is shown in Fig. 3, which will be seen to be the same as Fig. 1 with a few additional elements.

Two similar amplitude modulators 9 and 10 are inserted between the subtracting device 3, and the delay network 2 and between the regenerator 1 and subtracting device 3 respectively. The modulators 9 and 10 are supplied with carrier waves in the same phase from a carrier wave generator 11, which may supply a carrier frequency of 20 kilocycles per second, for example. A demodulator 12 is connected between the switch 4 and the integrator 6. This demodulator is also supplied from the generator 11 in the same phase as the modulators 9 and 10.

Figure 5:
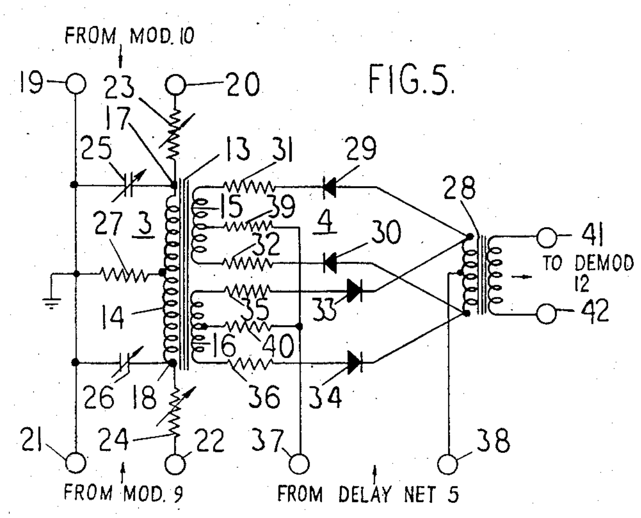
Figs. 5 and 6 show circuit details of certain elements of Fig. 3.

The modulator 9 is effectively a reversing switch controlled by the signals from the delay network 2 in such manner that during marking periods the carrier waves are supplied to the subtracting device 3 without change of phase, while during a spacing period, they are supplied with a phase change of 180°. The modulator 10, demodulator 12, and switch 4 are all similar to the modulator 9, and details of a convenient form of this circuit are shown in Fig. 5.

The operation of Fig. 3 will be explained with reference to Fig. 4. For clearness it will be assumed that the phase of the carrier waves at the output of the generator 11 is zero or reference phase.

Figure 4:
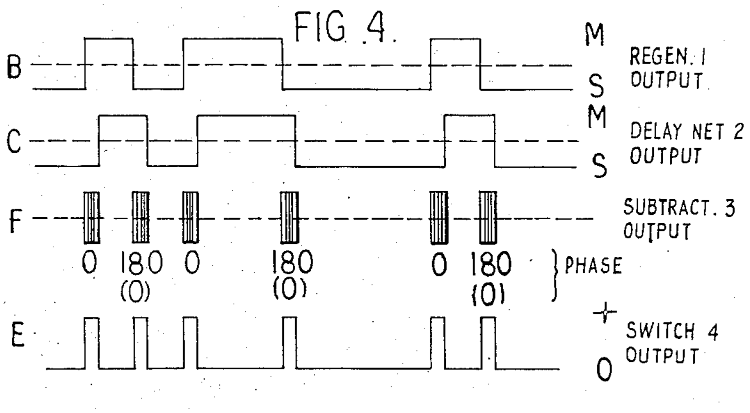
Fig. 4 shows graphical diagrams used in the explanation of the operation of Fig. 3.

In Fig. 4 curves B and C represent the wave forms of signals at the output of the regenerator 1 and the delay network 2, respectively, and correspond respectively to curves B and C of Fig. 2, though a more varied signal is shown in Fig. 4.

It will be assumed that when the modulators 9 and 10 have a marking condition applied to them they supply carrier waves of zero phase to the subtracting device 3 and when they have a spacing condition applied they supply carrier waves of 180° difference. Thus, provided that the amplitudes at the outputs of the modulators 9 and 10 are equal, there will be no output from the subtracting device 3 when the signal conditions applied to the two modulators 9 and 10 are the same, but when the signal conditions applied are opposite, waves of zero phase will be obtained at the output of the subtracting device 3 when the modulator 10 has an applied marking condition, and waves of 180° phase when it has an applied spacing condition. Thus the waves at the output of the subtracting device 3 will be as shown by curve F of Fig. 4. These will be rectangular "packets" of waves of duration one quarter of a unit period (on the same assumption as Fig. 2) and the phases will be alternately zero and 180° as indicated. Thus the "packets" of curve F of Fig. 4 correspond with the alternately positive and negative direct current pulses shown in curve D of Fig. 2.

Under control of the signals from the delay network 5 (Fig. 3) the switch 4 reverses the phase of the 180° packets only as indicated by the designations 0 in brackets in curve F of Fig. 4. Thus all the packets are applied in zero phase to the demodulator 12 (Fig. 3) and after combination with the demodulating waves from the generator 11 produce the positive direct current control pulses shown in curve E, Fig. 4, which are similar to those shown in curve E, Fig. 2, and control the oscillator 7, Fig. 3 after integration by the integrator 6 as previously explained.

The conditions illustrated in Fig. 4 apply to the case in which the sampling pulses are too early. If they are too late, it will be easily appreciated that the wave packets shown by curve F of Fig. 4 will all have phases opposite to those indicated, so that after passing through the switch 4 all the packets will be at a phase of 180°, and after demodulation by the zero phase carrier waves in the demodulator 12 will produce negative control pulses instead of the positive control pulses shown in curve E of Fig. 4. It will thus be appreciated that the inclusion of the elements 9 to 12 in Fig. 3 has not effectively altered the operation of the circuit, but it simplifies the design of the subtracting circuit 3 and enables some amplification to be included without stability troubles. No amplifiers are shown in Fig. 3, but clearly they can be included anywhere in the alternating current or other circuits as desired. In practice, it will probably be found convenient to insert an alternating current amplifier (not shown) between the elements 4 and 12.

Circuit details of the preferred form of devices 3 and 4 of Fig. 3 are shown in Fig. 5. A transformer 13 which is shared by the two devices, has a centre-tapped primary winding 14 and two equal centre-tapped secondary windings 15 and 16. The end terminals of the primary winding 14 are designated 17 and 18. The subtracting circuit 3 comprises the primary winding 14 and the elements connected to it. It includes a pair of input terminals 19 and 20 for connection to the output of the modulator 10 (Fig. 3), and a second pair of input terminals 21 and 22 for connection to the output of the modulator 9. Terminals 19 and 21 are connected to ground, and terminals 17 and 18 are connected to the input terminals 20 and 22 through respective small adjustable resistors 23 and 24, and to ground through respective small adjustable capacitors 25 and 26. The centre tap of winding 14 is connected to ground through a resistor 27.

It will be clear that the flux generated by the winding 14 will be proportional to the vector difference between the amplitudes of the waves applied to terminals 17 and 18 of the primary winding 14. While the amplitudes at the output of the modulators 9 and 10 will be nominally equal and in the same or in opposite phase, in practice this condition is seldom exactly fulfilled. The adjustable resistors 23 and 24 are therefore provided to enable the amplitudes applied to terminals 17 and 18 to be adjusted to equality, and the capacitors 25 and 26 for adjusting the phase so that no flux is produced when a marking condition is applied to each of the modulators 9 and 10. In practice it may not be necessary to provide both resistors 23 and 24 or both capacitors 25 and 26 if means are provided for switching a single resistor or capacitor to the side where it is needed.

The switch circuit 4 comprises the windings 15 and 16 and the elements connected to them. These elements comprise an output transformer 28 with a centre-tapped primary winding the terminals of which are respectively connected to the terminals of the secondary winding 15 through respective rectifiers 29, 30 and equal resistors 31 and 32. The rectifiers 29 and 30 are both directed as indicated so that they will both be unblocked if the primary winding of the transformer 28 is positive to the secondary winding 15. This primary winding is also connected to the secondary winding 16 by two similar rectifiers 33 and 34 and two equal resistors 35 and 36, but the rectifiers 33 and 34 are directed oppositely to the rectifiers 29 and 30 as indicated. A pair of input terminals 37, 38 are provided for connection to the output of the delay network 5 (Fig. 3). Terminal 37 is connected to the centre taps of windings 15 and 16 through equal resistors 39 and 40, and terminal 38 is connected directly to the centre tap of the primary winding of the output transformer 28. The secondary winding of the output transformer 28 is connected to a pair of output terminals 41 and 42 to which the input of the demodulator 12 (Fig. 3), is connected, preferably through an amplifier (not shown).

The windings 15 and 16 should be wound in opposite directions in such manner that a current flowing downwards in both windings as seen in Fig. 5 would produce opposing fluxes.

It will be assumed that when a marking condition is applied to the switch 4 from the delay network 2, terminal 37 is negative to terminal 38. This will block the rectifiers 33 and 34 and unblock the rectifiers 29 and 30, so that only the upper path between the two transformers 13 and 28 is open. Let it be assumed that the connections are so poled that when a marking condition is applied to the modulator 10 (Fig. 3) and a spacing condition to the modulator 9, the output waves of terminals 41 and 42 are in zero phase. Then when the conditions applied to the two modulators are interchanged, the condition applied to terminals 37 and 38 will be a spacing condition, with terminal 37 positive to terminal 38. The rectifiers 33 and 34 will now be unblocked instead of the rectifiers 29 and 30 and the lower path is now open instead of the upper path. Since winding 16 is wound in the opposite direction to winding 15, a phase change of 180° now occurs, but since the direction of the flux due to winding 14 has also changed, the waves at terminals 41 and 42 will again be in zero phase. Thus as already explained, all the packets of waves indicated by curve F of Fig. 4 will be in zero phase.

Fig. 5 also serves to illustrate the circuit of each of the modulators 9 and 10, Fig. 3. Elements 19 to 27 (inc.) of Fig. 5 will be omitted and the carrier waves from generator 11 (Fig. 3), will be supplied to the terminals 17 and 18 of the primary winding 14 of Fig. 5. Terminals 37 and 38 will be connected to the output of the delay network 2 in the case of modulator 9 or to the output of the regenerator 1 in the case of modulator 10. It will be clear from what has already been explained that if a marking condition is applied to terminals 37 and 38 the waves obtained at terminals 41 and 42 will be in zero phase, while if a spacing condition is applied, they will be in 180° phase.

Figure 6:
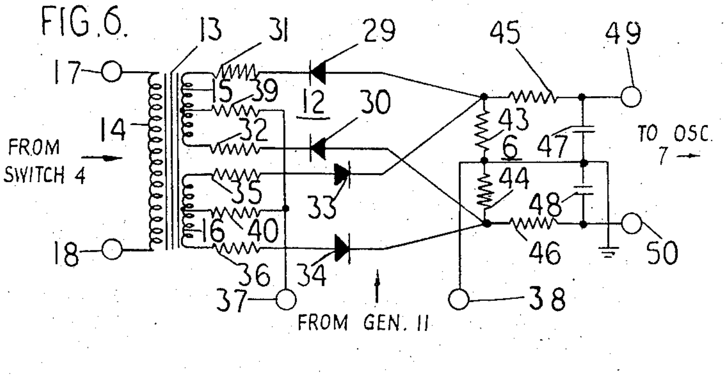

The preferred circuit for the demodulator 12, Fig. 3 is basically the same as that of the switch 4 shown in Fig. 5, but since a direct current output is produced an output transformer cannot be used. Fig. 6 shows the demodulator circuit connected to the circuit of the integrator 6 which replaces the transformer 28. Fig. 6 is otherwise the same as Fig. 5 with elements 19 to 27 inclusive omitted.

The primary winding of the transformer 28 of Fig. 5 is replaced in Fig. 6 by two equal resistors 43 and 44 connected in series, and forming part of the integrating circuit 6. The junction point of these two resistors is connected to terminal 38 and to ground. The integrating circuit also comprises two equal series resistors 45 and 46 and two equal shunt capacitors 47 and 48. Output terminals 49 and 50 will be connected to the control terminals of the oscillator 7 (Fig. 3).

In this case the waves from the switch 4 are supplied to the terminals 17 and 18 of the primary winding 14 of the transformer 13, and the waves from the carrier generator 11 are supplied to terminals 37 and 38. Direct current control pulses (as shown by curve E, Fig. 4) will flow through resistors 43 and 44 in series, the polarity of which pulses depends on whether the waves applied to terminals 17 and 18 have zero or 180° phase, and the capacitors 47 and 48 will integrate the pulses and will produce between terminals 49 and 50 a control voltage whose magnitude and sign is determined by the duration and polarity of the pulses, for controlling the frequency of the oscillator 7, as already explained.

A suitable value for the resistors 45 and 46 is 7.5 megohms and for the capacitors 47 and 48 is 8 microfarads giving a time constant of 60 seconds. Resistors 43 and 44 may conveniently each be 15,000 ohms.

Figure 7:
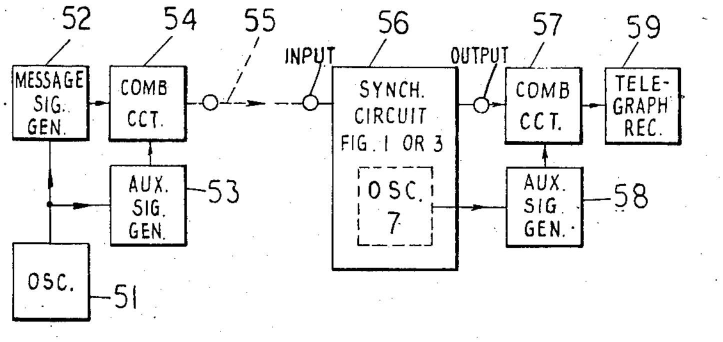
Fig. 7 shows a block schematic circuit diagram of a telegraph system employing a receiving circuit according to the invention.

Fig. 7 shows a block schematic circuit of a telegraph system which employs a synchronising circuit according to the invention, and in which a continuous auxiliary signal of predetermined type is combined with the traffic signals before transmission, in order that transitions may be always available for maintaining control of the oscillator at the receiving end during intervals when no traffic signals are being sent. The auxiliary signal is removed from the combined signal at the receiving end before application to the telegraph receiving device.

In Fig. 7 the apparatus at the transmitting end of the system comprises a master oscillator 51 which controls or synchronises the normal message signal generator 52, and also a generator 53 of an auxiliary signal of predetermined type which may, for example, be simple reversals. The signals from the generators 52 and 53 are applied to a combining circuit 54 which is connected to a communication circuit or channel shown dotted at 55.

The combining circuit 54 is similar in principle to the switch circuit 4 of Figs. 1, 3 or 5 and operates in such manner that the signal condition during any unit period set up by the message signal generator 52 is reversed if the auxiliary signal generator 53 is producing a mark during that unit period, but not reversed if the generator 53 is providing a space. The effect of this is to eliminate some transitions but to add others so that over a long period the total number of transitions per second is not appreciably altered.

The circuit or channel 55 is connected at the receiving end to the terminal marked Input of a synchronising circuit 56 as shown in Fig. 1 or 3. The only element of circuit 56 shown in Fig. 7 is the oscillator 7. The terminal marked Output of circuit 56 is connected to a combining circuit 57 exactly the same as the circuit 54. The output from the oscillator 7 of the circuit 56 is applied also to synchronise an auxiliary signal generator 58, which is the same as the generator 53, and which controls the combining circuit 57 in just the same way as the generator 53 controls the combining circuit 54. Thus it will be seen that if the generator 58 produces the same auxiliary signal as the generator 53, those parts of the message signal which were reversed at the transmitting end will be reversed again, so that the signal will be restored to its original form before application to the receiver 59.

It will be appreciated that should transmission of the ordinary message signals be stopped, the generator 52 will apply a constant marking (or a constant spacing) condition to the combining circuit 54, and the effect of the auxiliary signal generator 53 will be to transmit the auxiliary signals over the circuit 55, which will provide a continuous series of transitions for operating the synchronising circuit 56.

This expedient would only fail if the message signals and the auxiliary signals were identical or if one were the inverse of the other. It is thus only necessary to ensure that the auxiliary signal chosen is not the same as any signal likely to be transmitted for any long period from the message generator 52.

Figure 8:
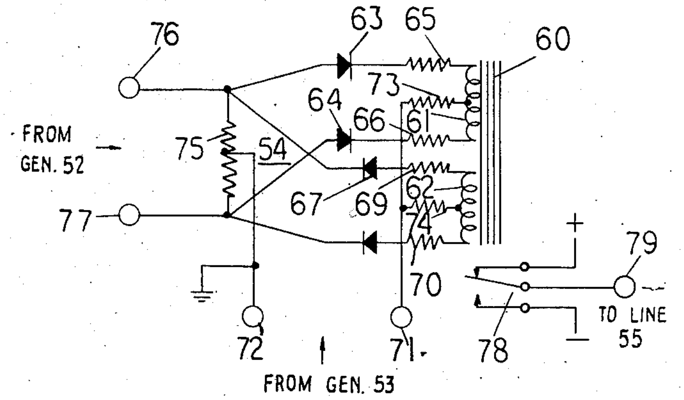
Fig. 8 shows circuit details of an element of Fig. 7.

One form which the combining circuits 54 and 57 may take is shown in Fig. 8. It is an adaptation of Fig. 5 for direct current signals.

A double-current polar relay 60 has two similar centre-tapped operating windings 61 and 62 wound in opposite directions in the same manner as the secondary windings 15 and 16 of the transformer 13 of Fig. 5. Elements 63 to 74 of Fig. 8, are similar respectively to elements 29 to 40 of Fig. 5 and are connected similarly. The primary winding of the transformer 28 of Fig. 5 is replaced in Fig. 8 by a centre-tapped resistor 75, one end of which is connected to the junction point of rectifiers 63 and 67, and to an input terminal 76, and the other end to the junction point of rectifiers 64 and 68 and to a second input terminal 77. The centre tap of the resistor 75 is connected to terminal 72 and to ground. The movable contact of a set of changeover contacts 78 controlled by the windings 61 and 62 of the relay 60 is connected to an output terminal 79, and the fixed contacts are respectively connected to positive and negative sources as indicated.

Terminals 76 and 77 are intended to be connected to the output of the message signal generator 52 of Fig. 7, and terminals 71 and 72 to the output of the auxiliary signal generator. Terminal 79 will be connected to the channel 55.

Let it be assumed that when the auxiliary generator 53 applies a marking condition to the combining circuit, terminal 71 is negative to terminal 72. Then rectifiers 63 and 64 are unblocked and the upper path will be open. Let it be assumed that when the message signal generator 52 applies a marking condition to terminals 76 and 77, the relay contacts 78 are in the marking position shown. Clearly when the generator 52 applies a spacing condition, the contacts 78 will be changed over to the spacing condition opposite to that shown.

Now let the auxiliary generator 53 apply a marking condition. Then rectifiers 63 and 64 will be blocked and 67 and 68 will be unblocked, and the lower path is now open. Since the winding 62 is wound oppositely to winding 61, the contacts 78 will be changed over to the spacing condition in response to a marking condition applied at terminals 76 and 77. Thus it will be clear that the application of a marking condition to terminals 71 and 72 reverses the condition applied by the message signal generator 52, while the application of a spacing condition does not reverse the condition applied by the generator 52.

When the circuit of Fig. 8 is used for the combining circuit 57 at the receiving end, the output of the synchronising circuit 56, Fig. 7 will be connected to terminals 76 and 77 of Fig. 8, while the auxiliary signal generator 58 will be connected to terminals 71 and 72, and the telegraph receiver 59 to terminal 79. The circuit 57 will then operate exactly as just described to remove the auxiliary signal from the combined signals at the output of the synchronising circuit 56.

While the principles of the invention have been described above in connection with specific embodiments, and particular modifications thereof, it is to be clearly understood that this description is made only by way of example and not as a limitation on the scope of the invention.

What we claim is:

1. A receiving circuit for receiving communication signals for a synchronous electric telegraph system of the type not requiring the transmission of synchronizing pulses comprising means controlled by an oscillator for regenerating the received signals, means for deriving from the received signals and from the regenerated signals a train of unidirectional control pulses whose duration and polarity are determined by the time difference between corresponding transitions of the received signals and the regenerated signals, means for integrating the unidirectional control pulses, and means for applying the integrated pulses to adjust the oscillator frequency in such manner as substantially to maintain a specified time difference between the said received signals and the regenerated signals.

2. A circuit according to claim 1, comprising means for delaying the received signals by half the unit period, means for combining the delayed received signals with the regenerated signals in such manner as to produce a train of alternately positive and negative pulses whose durations are determined by the time intervals between corresponding transitions of the said delayed and regenerated signals, and means for inverting every alternate pulse of the said train of pulses in order to produce the said train of unidirectional control pulses.

3. A circuit according to claim 2, comprising means for applying the said train of positive and negative pulses to a switch circuit controlled by the said regenerated signals after a delay of half the unit period in such manner as to invert the pulses corresponding to receive transitions in one sense but not those corresponding to received transitions in the other sense.

4. A circuit according to claim 1, comprising means for delaying the received signals by half the unit period, means for separately modulating a carrier wave by the delayed signals and by the regenerated signals, means for combining the two trains of modulated carrier waves in such manner as to obtain a series of wave packets whose durations are determined by the time difference between corresponding transitions of the said delayed and regenerated signals, the wave of every pair of adjacent packets being respectively in opposite phase, means for reversing the phase of every alternate wave packet, and means controlled by the unmodulated carrier wave for demodulating the said wave packets after such phase reversed in order to produce the said train of unidirectional control pulses.

5. A circuit according to claim 4, in which the means for combining comprises a transformer having a primary winding, and means for applying the two trains of modulated carrier waves respectively to opposite ends of the said primary winding in such manner that the flux generated by the said primary winding is proportional to the vector difference of the amplitudes of the said two trains of modulated carrier waves.

6. A circuit according to claim 4 comprising means for applying the said series of wave packets to a switch circuit controlled by the said regenerated signals after a delay of half the unit period in such manner as to reverse the phase of those wave packets corresponding to received transitions in one sense but not the phase of those corresponding to receive transitions in the other sense.

7. A circuit according to claim 6 in which the said switch circuit comprises means for supplying the said series of wave packets to an output circuit through one of two separate paths, each path containing one or more rectifiers arranged, when appropriately polarised, to block the path, means for producing a phase reversal in one only of the said paths, and means for applying the delayed regenerated signals to the rectifiers in such manner as to block one path in response to one signal condition of the delayed regenerated signals, and to block the other path in response to the other signal condition.

8. A synchronous telegraph system as claimed in claim 1 further, comprising means in the transmitting circuit for combining a continuous auxiliary signal of predetermined form with the message signals before transmission over the communication channel, and means in the receiving circuit controlled by the said oscillator for removing the auxiliary signal from the regenerated received signals before application to a telegraph receiving device.

9. A system according to claim 8, comprising in the transmitting circuit a message signal generator, a first auxiliary signal generator for generating the said continuous auxiliary signal, a master oscillator for synchronising both the said generators, a first switch circuit connecting the message signal generator to the communication channel, and means for applying the signals from the first auxiliary generator to the switch circuit in such manner that the signal condition applied by the message signal generator is reversed before application to the communication channel when the auxiliary signal generator applies a given one of the two signal conditions to the switch circuit, and not when it applies the other signal condition.

10. A system according to claim 9, comprising in the receiving circuit a second auxiliary signal generator synchronised by the oscillator of the said receiving circuit for generating the said continuous auxiliary signal, and a second switch circuit through which the regenerated received signals are applied to the telegraph receiving device, the second switch circuit being similar to the first switch circuit and being controlled by the second auxiliary signal generator in substantially the same way as the first switch circuit is controlled by the first auxiliary signal generator, whereby the auxiliary signal is removed from the said regenerated signals before application to the telegraph receiving device.

References Cited in the file of this patent

UNITED STATES PATENTS 2,399,421 Artzt ---------------- Apr. 20, 1946
2,655,556 Abelson -------------- Oct. 13, 1953